Jan. 8, 1952     L. L. PHILLIPS     2,582,064
STOP JOINT FOR CABLES
Filed March 31, 1948
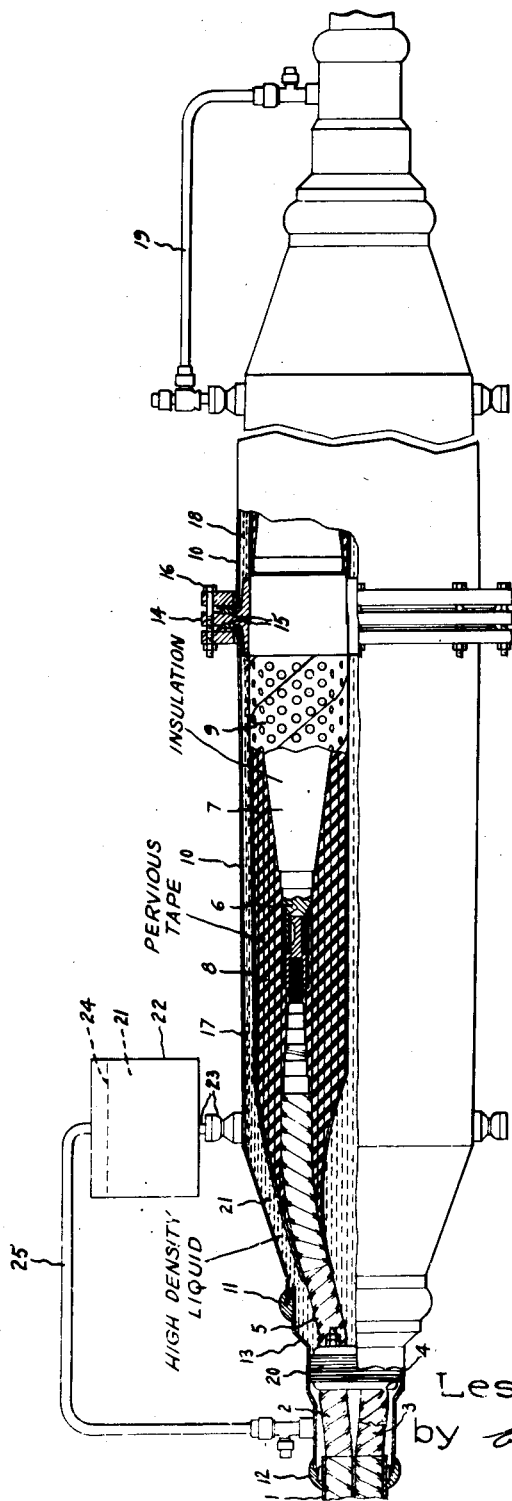
Inventor:
Lester L. Phillips,
by Ernest C. Britton
His Attorney.

Patented Jan. 8, 1952

2,582,064

UNITED STATES PATENT OFFICE 2,582,064

STOP JOINT FOR CABLES

Lester L. Phillips, Pittsfield, Mass., assignor to General Electric Company, a corporation of New York Application March 31, 1948, Serial No. 18,101

1 Claim. (Cl. 174—22)

The present invention relates to what are commonly known as stop joints for fluid filled electric cables and more particularly to a stop joint for the interconnection of a gas filled cable with a liquid filled cable.

The purpose of stop joints in general is to electrically connect corresponding ends of cable sections, prevent exchange of the insulating fluid from one section to the other and, in the case of liquid filled cables, to limit the hydrostatic pressure to which the sections of a cable system may be subjected. Ordinarily, if adjacent cable sections are filled with the same fluid, a small exchange of the filler through the stop joint therebetween is of small consequence because no electrical deterioration can be caused thereby. For example, if adjacent cable sections were both filled with oil and the joint therebetween had a small leakage through the cores which are components therein, the electrical strength will remain constant because the connected cable sections are filled with the same liquid. If, on the other hand, one of the cable sections were gas filled, a small leakage through the cores would permit gas entrance to the oil filled cable section. Such entrance of gas is prohibitive in an oil filled cable since gas will deteriorate the insulation at the oil filled cable end of the joint. Heretofore, attempts have been made to eliminate such leakage but all such attempts have either been inadequate or have resulted in an elaborate and complicated joint far removed from the more or less conventional and standard joint commonly employed for the interconnection of cable sections filled with the same fluid and a non-recoverable loss of gas with consequent pressure drop in the gas filled cable sections has usually been associated with such special joints. The leakage is especially difficult to prevent in the usual case where the gas in one cable section is at a higher pressure than the liquid in the adjacent cable section connected thereto.

It is therefore an object of my invention to provide a new and improved stop joint for the connection of an oil filled cable with a gas filled cable.

It is also an object of my invention to provide a stop joint for the interconnection of a gas filled cable with an oil filled cable of simple construction substantially identical with conventional stop joints currently employed for the interconnection of cable sections containing the same fluid.

It is a further object of my invention to provide a stop joint which will effectively prevent the leakage of a fluid in a cable section under high pressure into an adjacent cable section containing a fluid under a lower pressure without at the same time incurring a loss of the higher pressure fluid from and the resulting pressure drop in the high pressure cable section.

In accordance with my invention, I completely fill a compartment in a stop joint with a fluid having a greater density than the fluid in the cable section adjacent the compartment, provide means to prevent transfer of the fluid from the compartment into the adjacent cable and additional means for escape from the compartment of the lesser density fluid which might enter therein from the adjacent cable section.

The nature of the invention will be better understood from the following description when taken in connection with the accompanying drawing and the scope of my invention will be pointed out in the appended claim. In the drawing, the only figure illustrated shows a stop joint partly in section and partly in elevation for a three-conductor cable in which I indicates the lead sheath of a three-conductor gas filled cable. Only one cable end or section of the joint is shown, the opposite end being of similar construction except that the cable section adjacent thereto is filled with oil at a lower pressure than the gas filled cable section. Within the sheath are three conductors 2, 3, and 4, each of which is covered with factory wound insulation 5 which ordinarily is of paper, but other forms of insulating material may be used.

Each conductor of the gas filled cable section on the left is electrically connected by a connector 6 with a corresponding conductor of the liquid filled cable section on the right.

Each connector 6 is separately wrapped with an insulating core 7 practically non-pervious to the passage of liquid but pervious in so far as gases are concerned especially after some use when and if it delaminates and permits fluid flow lengthwise through the core. Bodies of pervious insulating tape 8 have been applied over the ends of each connector, the conductors united thereby and the factory wound insulation on the conductors. Surrounding the body of hand-applied tape 8 is an electrostatic shield 9 which may be in the form of the preforated copper tape illustrated or wrappings of metalized braid.

The connectors and conductors thus joined and insulated are spaced from and enclosed within a tubular metal casing 10 made in two parts, the plane of division being perpendicular or transverse to the axis of the cable and midway between the ends of the casing which are respectively united fluid tight by wiped joints 11 and 12 through casing extension 13 to the sheath of the gas filled cable section and by similar wiped joints and a casing extension to the sheath of the oil filled cable section. 14 indicates a partition mounted in a fluid tight manner by gaskets 15 and a series of bolts 16 between the out-turned flanges of the two casing sections 10. The partition has as many openings therein as there are conductors, the connectors of which respectively extend therethrough. The joint between the insulation on each connector and each opening in the partition is made fluid tight in any suitable manner. The space within the casing sections around the insulated conductors and connectors is thus divided into two compartments 17 and 18, the right-hand one of which 18 is interconnected by equalizing by-pass 19 with the liquid filled cable section and contains the same oil as is contained therein.

At the gas filled cable end of the joint or compartment 17, I provide and mount transversely a semi-stop or partition 20 through which each of the insulated conductors extends. The semi-stop prevents any appreciable flow of fluid from the adjacent cable section but will not prevent a slow transfer of the fluid through the insulation on the conductors.

From the description thus far, it will be apparent that any gas which should enter the left-hand compartment 17 through the insulations on the conductors will tend to be forced into the liquid filled cable end of the joint through the core insulation 7 which, as previously pointed out, might be pervious due to possible delaminations or gasket leakage in so far as gas is concerned especially when under a relatively higher pressure. However, in accordance with my invention, the compartment 17 is completely filled with a compound or liquid 21 having a density greater than the filler gas in the adjacent cable section and a viscosity sufficiently high to prevent flow of the fluid through the semi-stop 20 into the cable proper. For example, a mineral oil may be employed having a specific gravity of approximately .930 at 60—60° F., a viscosity at 100° C. in Saybolt Universal seconds of 95 to 105, a minimum flash point of 235° C., a power factor of .01 at 100° C. and a dielectric strength of 30 kw. at 80° C. As a result, any gas which might pass from the gas filled cable through the semi-stop into the compartment 17 will rise to the uppermost region of the enclosure or compartment because its density is less than that of the liquid or compound 21. Any gas which finds its way from the conductor insulation into the insulation 8 will take the path of least resistance therethrough to the liquid filled spaces therearound rather than to the surfaces of the insulation 7 inasmuch as the insulation 8 is much more pervious than the insulation 7. Moreover, the pervious insulation 8 is thoroughly saturated with the heavier density fluid 21 which further aids in directing the gas away from the insulation 7 to the fluid filled space in the compartment 17. So that the compartment 17 will be completely filled at all times even during minimum temperature conditions and at the same time provide for expansion and contraction of the fluid 21, a reservoir 22 is positioned above the joint and the hollow interior thereof is connected with the compartment 17 by means of the connection 23. Thus, gas entering the joint is prevented from reaching portions thereof through which there might be defects to permit leakage into the liquid filled cable since it is driven upwardly completely out of the joint through the outlet or connection 23 at the top side of the casing to the surface 24 of the liquid 21 in the reservoir 22. Escaped gas collected in the space above the liquid level 24 is returned to the gas filled cable by means of the conduit 25.

While I have, in accordance with the patent statutes, shown and described a particular cable joint embodying my invention and cable sections united thereby filled with particular fluids, changes and modifications therein will be obvious to those skilled in the art and I, therefore, aim in the appended claim to cover all such changes and modifications as fall within the true spirit and scope of my invention.

What I claim as new and desire to secure by Letters Patent of the United States is:

A stop joint for the interconnection of a liquid filled cable section with a gas filled cable section comprising sheathed cable sections one of which contains a separately insulated conductor and oil under a given pressure while the other contains a separately insulated conductor and gas under a higher pressure, a connector electrically connecting said conductor in said oil-filled section with the conductor in said gas filled section, a casing surrounding and spaced from said connector, the ends of said casing being respectively united fluid tight to the sheaths of said cable sections, transverse partitioning means to sealingly partition the space within said casing into two compartments, one of said compartments containing the same liquid and being in communication with and under the same pressure as the liquid filled cable section, the other of said compartments being in communication with and under the same pressure as the gas filled cable section, said connector covered with insulation pervious to the gas in said gas filled section and extending longitudinally through an opening in said transverse partition, the joint between said opening and said insulation being sufficiently tight to prevent the passage of fluid therebetween, bodies of gas and oil pervious insulating tape applied over the ends of said connector and the conductors united thereby and their insulations, a semi-stop mounted transversely at the gas filled cable end of said casing with said insulated conductor of the gas filled cable section extending therethrough, a second liquid different from said liquid contained in said liquid filled cable section completely filling said casing on the gas filled cable side of said partition, said second liquid having a density greater than the gas in said gas filled cable section and having sufficient viscosity to prevent passage through said semi-stop, a reservoir partially filled with said second liquid mounted above said casing and connected thereto at the uppermost surface thereof to permit volumetric changes of said second liquid and maintain complete filling of said casing therewith and a fluid line connecting the space above said second liquid in said reservoir with said gas filled cable section.

LESTER L. PHILLIPS.

REFERENCES CITED

The following references are of record in the file of this patent:

UNITED STATES PATENTS

| Number | Name | Date |
|---|---|---|
| 1,834,864 | Phillips | Dec. 1, 1931 |
| 1,896,841 | Eby | Feb. 7, 1933 |
| 2,075,019 | Buck et al. | Mar. 30, 1937 |
| 2,080,829 | Meyer et al. | May 18, 1937 |
| 2,239,900 | Papp | Apr. 29, 1941 |
| 2,253,987 | Shanklin | Aug. 26, 1941 |
| 2,392,748 | Lee | Jan. 8, 1946 |